United States Patent
Chu

(10) Patent No.: US 6,598,898 B2
(45) Date of Patent: Jul. 29, 2003

(54) FOLDING CART

(75) Inventor: Yong S. Chu, Glendale, CA (US)

(73) Assignee: Aports Training Devices, LLC, Livingstone, NJ (US)

( * ) Notice: Subject to any disclaimer, the term of this patent is extended or adjusted under 35 U.S.C. 154(b) by 0 days.

(21) Appl. No.: 09/909,449

(22) Filed: Jul. 18, 2001

(65) Prior Publication Data

US 2003/0015858 A1 Jan. 23, 2003

(51) Int. Cl.$^7$ ................................................. B62B 1/12
(52) U.S. Cl. .................. 280/652; 280/639; 280/47.131; 280/47.26; 280/DIG. 3
(58) Field of Search ................................ 280/652, 639, 280/40, 645, 47.131, 651, 43.1, 47.18, 47.26

(56) References Cited

U.S. PATENT DOCUMENTS

| | | | |
|---|---|---|---|
| 1,769,418 A | | 7/1930 | Cooper et al. |
| 2,421,750 A | | 6/1947 | Giordano |
| 2,472,407 A | | 6/1949 | David et al. |
| D155,640 S | | 10/1949 | Stoll |
| 3,207,526 A | * | 9/1965 | Brodeck ..................... 280/652 |
| 3,236,536 A | * | 2/1966 | Shore ......................... 280/652 |
| 3,310,317 A | * | 3/1967 | Luff ........................... 280/652 |
| 3,388,920 A | | 6/1968 | Hill, Sr. et al. |
| 3,479,052 A | | 11/1969 | Spielman |
| 3,514,123 A | * | 5/1970 | Injeski ....................... 280/652 |
| 3,640,547 A | * | 2/1972 | Friedman ................... 280/652 |
| 3,677,571 A | * | 7/1972 | Maturo, Jr. et al. ......... 280/652 |
| 3,992,038 A | * | 11/1976 | Guadano, Sr. .............. 280/652 |
| 3,997,213 A | * | 12/1976 | Smith et al. ................. 280/652 |
| 4,765,644 A | | 8/1988 | Bell |
| 4,865,346 A | | 9/1989 | Carlile |
| 5,118,130 A | | 6/1992 | Kaltz |
| 5,197,754 A | | 3/1993 | Ward |
| D334,640 S | | 4/1993 | Forish |
| 5,265,892 A | * | 11/1993 | Said ........................... 280/652 |
| 5,915,722 A | | 6/1999 | Thrasher et al. |
| 5,988,671 A | * | 11/1999 | Abelbeck et al. ........... 280/652 |
| 6,354,609 B1 | * | 3/2002 | Chen et al. ................. 280/11.3 |
| 6,354,619 B1 | * | 3/2002 | Kim ........................... 280/651 |

* cited by examiner

Primary Examiner—Brian L. Johnson
Assistant Examiner—Jeff Restifo
(74) Attorney, Agent, or Firm—Gene Scott-Patent Law & Venture Group

(57) ABSTRACT

A foldable cart apparatus includes a first, second and third U-shaped frames pivotally joined and functionally movable between a folded attitude and an unfolded attitude. Its primary function is for carrying articles such a beach related items. In the folded attitude the frames are positioned adjacently. In the unfolded attitude the first and second frames diverge upwardly and the second and third frames diverge downwardly as viewed from the side. The first frame is engaged with a bottom strut supported on spaced apart wheels for moving the apparatus on a surface. A flexible sling is engaged with the first and the third of the frames, so that in the unfolded attitude, a vertical rear containment wall and a horizontal bottom shelf are formed. A flexible fabric bag is fastened between the first and second of the frames and forms an open topped container for receiving the items for transport. The bottom shelf can be used to support an ice chest or other bulky article.

12 Claims, 2 Drawing Sheets

FOLDING CART

BACKGROUND OF THE INVENTION

1. Field of the Invention

This invention relates generally to hand drawn carts especially of the type that fold flat for storage, and more particularly to such a cart providing improved features and capabilities.

2. Description of Related Art

Stoll, U.S. D155,640 describes a collapsible utility card design.

Forish, U.S. D344,640 describes a beach cart design.

Cooper et al., U.S. Pat. No. 1,769,418 describes a package carrier consisting of a foldable receptacle, a frame comprising foldable side members, upper cross members secured in said side members for supporting the receptacle; lower cross members slidably secured in said side members for supporting the lower edges of the receptacle; and wheels rotatably mounted on the lower ends of the side members.

Giordano, U.S. Pat. No. 2,421,751 describes a collapsing shopping device, consisting of a pair of folding side frames, each frame consisting of side bars pivotally connected to each other midway of their ends, one side bar of each frame having a ground wheel and the other side bar bearing engagement with the ground and provided with a handle on its upper end folding and a shopping receptacle supported on and between the two side frames.

David et al., U.S. Pat. No. 2,472,407 describes a folding cart, a main elongated U-shaped back frame having a handle, wheels attached to the lower end portion of said frame, a seat frame of U-shaped form having one end portion pivotally mounted between intermediate portions of the frame members of the first named frame, a third U-shaped leg frame, the arms thereof being rigid and pivotally connected to the free ends of the arms of the second named seat frame, connecting links between and connected with the first and the third one end to the first named frame and at the opposite end to a rod carried by interconnected portions of the second and third named frames.

Hill, Sr., et al., U.S. Pat. No. 3,388,920 describes A shopping cart comprising a frame including a substantially erect main frame member having a cart handle at its upper end, laterally spaced main wheels rotatably mounted at the lower end of said main frame member for movement of the cart along a supporting surface, auxiliary frame means articulately connected to said main frame member for movement relative thereto between a rested position substantially coplanar with said main frame member and an extended position where said auxiliary frame means projects forwardly from said main frame member, and auxiliary wheel means rotatably mounted on said auxiliary frame means and being adapted, in said extended position of the latter, to engage the supporting surface along which the cart is movable at locations spaced forwardly from said main wheels; and a carrier for articles including a main rigid wall articulately connected to said frame for movement between a substantially vertical position coplanar with said main frame member when said auxiliary frame means is in said nested position and a substantially horizontal position when said auxiliary frame means is in said extended position, an end wall extending from the end of said main wall which is lowermost in said vertical position thereof thereby to form the bottom of the carrier in said vertical position of the main wall and the front of the carrier in said horizontal position of the main wall, side walls extending from the opposite sides of said main wall along the latter and being each joined, at one end, to said end wall, and a foldable wall pivotally mounted, at one end, between the other ends of said side walls to swing about an axis spaced from said main wall and being selectively disposable to close the back, of said carrier when said main wall is in said horizontal position and to close the front of said carrier when said main wail is in said vertical position.

Spielman, U.S. Pat. No. 3,479,052 describes a hand-pulled cart for transporting golf clubs along a golf course, the combination: of a pulling frame member, said pulling frame member embodying a pair of wheel elements, said wheel elements being spaced apart one from the other on a common horizontal axis of rotation, axle elements for each of the said wheel elements, a pair of side frame elements adjacent to and respective one to each of the said wheel elements and attached to the said axle elements, said side frame elements thereby being turnable with the said axle elements relative to the said wheel elements to a vertical position, said side frame elements then each extending perpendicularly upward from the said axle elements in a plane aligning with the said common axis for the said wheel elements, and a cross-element joining the said side frame elements one with the other substantially at the upper ends thereof; a golf club carrying rack member, said carrying rack member embodying provisions for receiving golf clubs in a substantially vertical array, said carrying rack member embodying a pivotal attachment toward the upper end thereof on an axis substantially parallel with the said common axis of rotation for the said wheel elements, said pivotal attachment joining the said carrying rack member to the said pulling frame member at a location downward from the said cross-element thereof and upward from the said wheel elements thereof, said carrying rack member extending from the said pivotal attachment downward along the said plane of the said pulling frame member to approximately the level of the lower reaches of the said wheel elements, said pivotal attachment permitting articulation of the said carrying rack member away from the said pulling frame member in the' direction opposite from the direction in which the cart is intended to be pulled; a knuckling linkage, said knuckling linkage being located at a level above the upper reaches of the said wheel elements and below the said pivotal attachment for the said carrying rack member, said knuckling linkage being pivotally attached on a lateral axis at a first end thereof to the said pulling frame member and pivotally attached on a lateral axis at a second end thereof to the said carrying rack member, said knuckling linkage embodying an intermediate pivot whereabout the same may fold downward, said knuckling linkage extending generally downward from the said first and second ends thereof when the said carrying rack member is articulated adjacent to the said pulling frame member, said knuckling linkage extending generally outstretched horizontally to limit articulation of the said carrying rack member when the same is articulated away from the said pulling frame member, said intermediate pivot of the said knuckling linkage being limited in upward movement to not reach alignment with the said pivotal attachments at the said first and second ends of the said knuckling linkage, and a seat element mounted to the said knuckling linkage on the said first end thereof, said seat element extending laterally between the said side frame elements of the said pulling frame member, said seat element lying in a substantially horizontal plane when the said carrying rack member is articulated to the maximum away from the said pulling frame member and when the said wheel elements and the lower end of the said carrying rack member are at rest on a horizontal surface.

Bell, U.S. Pat. No. 4,765,644 describes a folding cart designed to function as a supporting walker or a stackable grocery cart. The frame consists of two pivoted parts, the shorter pivoted at its upper end to points near the center of the longer, and the longer extending thereabove to form a handle. A foldable strut joins the pivoted parts below their junction. A fabric receptacle is foldably supported from the frame generally above the junction of the two pivoted parts. Suitable wheels or pivoted castors are mounted adjacent the lower ends of the two pivoted parts.

Carlile, U.S. Pat. No. 4,865,346 describes a hand-propelled cart assembly for use in support of activities such as picnicking or beach-going including a separable wheeled frame having an upright section comprising upper and lower portions. A foldable shelf member on the lower portion supports a cooler chest and is provided with elements precluding lateral shifting of the chest during movement of the cart. A pair of swingable arms on the lower portion accommodate one or more seating members such as folding chairs while receiver elements retain an umbrella and drink receptacles. The upper portion of the upright section supports a container having a fold down serving shelf adjacent an accessory panel presenting a radio, thermometer, clock and the like. A further receptacle, in the form of a closable bag is affixed behind the container. All components supported on the framework are individually removable and separately carried while the wheels may be likewise removed whereupon the cart is collapsed and folded for ease of transport, as in a vehicle trunk.

Kaltz, U.S. Pat. No. 5,118,130 describes a hand truck which may be collapsed by operation of a pivotable support plate and pivotable load bearing side brace members which may be readily detached from the support plate. The hand truck includes a substantially rectangular frame having an upper handle portion, two parallel side portions, and a lower portion. A pair of wheels are rotatably secured in opposed axial alignment on opposite sides of the lower portion of the frame. A support plate pivotably attaches to the lower portion of the frame so that the support plate may pivot about a substantially horizontal axis between a lower horizontally disposed operative position and an upper vertically disposed storage position. A pair of side brace members have lower portions adapted to removably engage the support plate proximate a respective side edge of the support plate and upper portions adapted to pivotably engage a respective parallel side portion of the frame so that each brace member may pivot about a substantially vertical axis between an operative position substantially perpendicular to the frame and a storage position against and substantially parallel to the frame.

Ward, U.S. Pat. No. 5,197,754 describes an improved cart for carrying articles comprising a rigid frame having a collapsible handle, a rear support portion and an axle with removable wheels and storage member for attaching the wheels to the frame in a manner to minimize the storage area required, together with a fabric article carrier having a opening at its upper end which is reinforced to normally urge the opening to an open position and a rigid member which is hinged to the frame and which is extendable to support the lower portion of the article carrier and which can be folded against the frame to facilitate storage of the cart.

Thrasher et al., U.S. Pat. No. 5,915,722 describes a means of transporting items such as those commonly taken to the beach or on a picnic over sandy or otherwise yielding terrain. The device is comprised of a wheeled, collapsible frame including a bottom frame suitable for supporting larger objects such as an ice chest. The disclosed invention also includes an upper frame which supports a pliable receptacle that is of sufficient size to hold a multitude of miscellaneous items such as blankets, beach toys, clothes, food, etc. The invention includes a retractable chair hanger to support a plurality of folding chairs in a hanging fashion thereby providing a stable environment for transporting the chairs with little risk of loosing the chairs when traveling over rough terrain. The frame is such that it allows foldability to such an extent that it collapses to a size that can be easily stored and transported.

The prior art teaches the use of carts similar to the subject of this application, but does not teach a cart having the structural features defined herein and the attendant advantages that these features provide. Of the two wheel, hand drawn carts, the most well known variety are the shopping carts with an upright handle portion mounted on two wheels and with a front portion that folds outwardly providing a basket for carrying groceries. Many other carts of similar construction are found in the prior art. However, the prior art does not teach the improved construction of the present invention which provides additional strength for a folded shelf for carrying an ice chest and other articles.

SUMMARY OF THE INVENTION

The present invention teaches certain benefits in construction and use which give rise to the objectives described below.

A foldable cart apparatus comprises a first, second and third U-shaped frames pivotally joined and functionally movable between a folded attitude and an unfolded attitude. Its primary function is for carrying articles such a beach related items. In the folded attitude the frames are positioned adjacently. In the unfolded attitude the first and second frames diverge upwardly and the second and third frames diverge downwardly as viewed from the side. The first frame is engaged with a bottom strut supported on spaced apart wheels for moving the apparatus on a surface. A flexible sling is engaged with the first and the third of the frames, so that in the unfolded attitude, a vertical rear containment wall and a horizontal bottom shelf are formed. A flexible fabric bag is fastened between the first and second of the frames and forms an open topped container for receiving the items for transport. The bottom shelf can be used to support an ice chest or other bulky article.

A primary objective of the present invention is to provide an apparatus and method of use of such apparatus that provides advantages not taught by the prior art.

Another objective is to provide such an invention capable of very low cost production and relative light weight.

A further objective is to provide such an invention capable of providing a basket for small items to be carried and a shelf for heavier items.

A still further objective is to provide such an invention capable of folding flat when not in use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
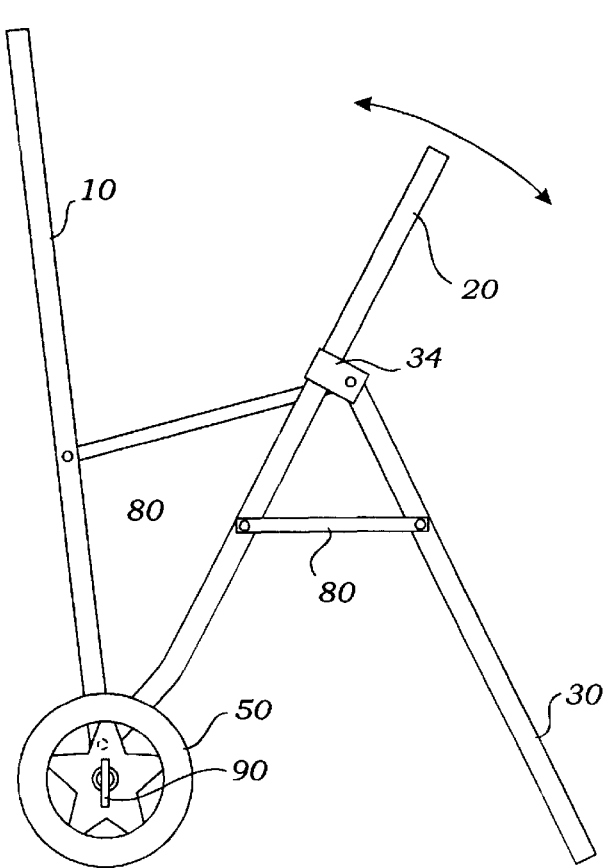
FIGS. 1 and 2 are side elevation views of the preferred embodiment of the invention, less a net basket and a canvas sling, in a deployed and a folded state.
Figure 2:
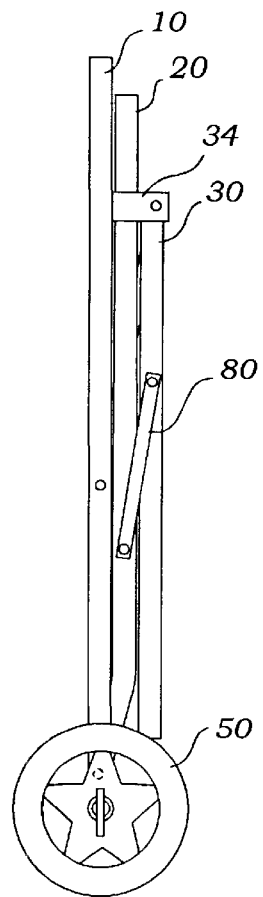
Figure 3:
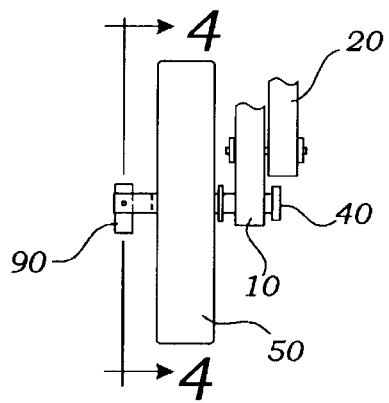
FIG. 3 is a partial front view of an axle and wheel thereof.
Figures 5, 5A, 6:
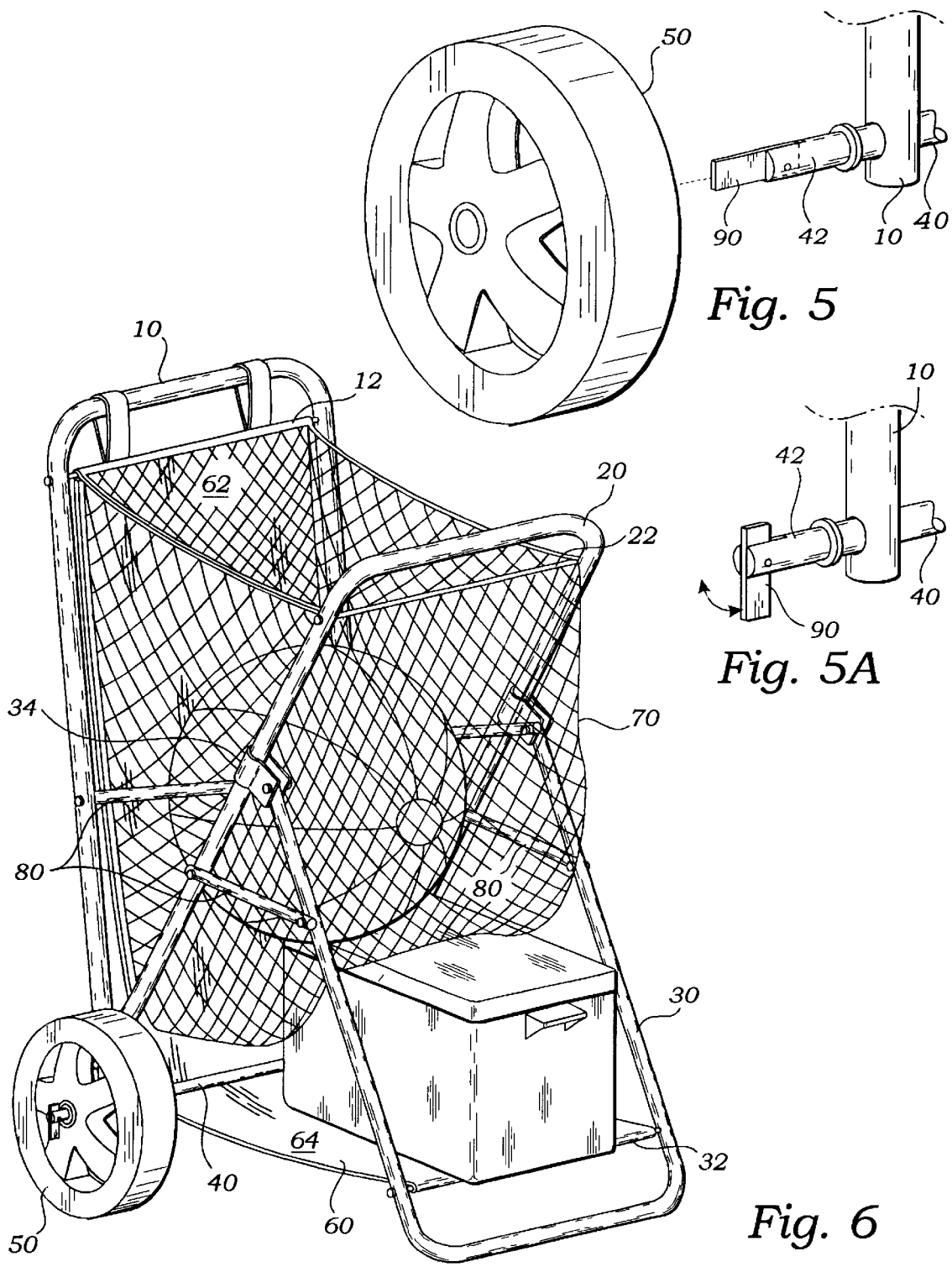
FIG. 5 is perspective partial view thereof showing the axle and wheel where a lug of the axle is positioned for receiving the wheel.
FIG. 5A is perspective partial view thereof showing the axle where the lug of the axle is positioned for retaining the wheel.
FIG. 6 is a perspective view for illustrating use thereof.

The present invention is a foldable cart apparatus having a first 10, second 20 and third 30 U-shaped frames as seen in FIGS. 1, 2 and 6. These frames are preferably made of metal tubes and are pivotally joined and functionally movable between a folded attitude (FIG. 2) wherein the frames 10, 20, 30 are positioned in adjacent planes, and an unfolded attitude (FIGS. 1, 6) wherein the first 10 and second 20 frames are positioned to diverge upwardly and the second 20 and third 30 frames are positioned to diverge downwardly, as is clearly shown in FIG. 1. Joining of such frames for pivotal and folding movement is well know in the art. The first frame 10 is engaged with a supporting means 40, preferably a single strut as shown in FIG. 1 or two separate and spaced apart struts, as shown in FIG. 3, which functions as a horizontal axle, supported on spaced apart wheels 50 adapted by rotation on the supporting means 40 for rotation in moving the apparatus on a surface (not shown). A flexible sling 60, preferably rectangular in shape and made of a fabric such as canvas or nylon, is engaged with the first 10 and the third 30 of the frames at cross rods 12 and 32 respectively. The sling 60 forms, when the apparatus is in the unfolded attitude (FIG. 1), a vertical rear containment wall surface 62 and a horizontal bottom shelf surface 64. The sling 60 is able to be drawn tight as it is folded around the bottom strut 40, as shown in FIG. 6. A flexible fabric bag 70, preferably of an open net fabric, as shown, is fastened between the first 10 and second 20 of the frames between cross rods 12 and 22, and thus forms an open topped container for receiving articles for transport in the manner shown in FIG. 6. Alternate embodiments provide for the sling 60 without the bag 70 and the bag 70 without the sling 60, and for both a shown in FIG. 1.

A plurality of pivotable side braces 80 join the frames 10, 20, 30 and functionally define the range of motion between the folded and unfolded attitudes of the apparatus. Additionally, the third frame 30 is joined to the second frame 20 by at least one sliding clamp 34, preferably two such clamps 34 located as shown in FIG. 6 at the upwardly terminal ends of the third frame 30 and these clamps 34 are adapted by size, shape and open aperture, so that the ends, of frame 30, are movable along the second frame 20 when folding and unfolding the apparatus.

Figure 4:
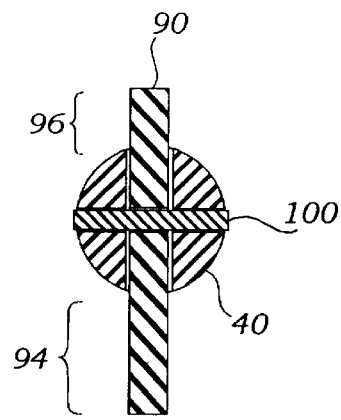
FIG. 4 is a section view thereof taken along line 4—4 of FIG. 3.

Preferably, the supporting means 40 provides, at opposing terminal ends 42, integral and pivotable lugs 90. The lugs 90 are positionable for enabling the supporting means 40 to receive the wheels 50 for mounting the wheels at opposing positions on the supporting means 40. The lugs 90 are alternately positionable for capturing the wheels 50 on the supporting means 40. This is clearly shown in FIGS. 5 and 5A and the construction is shown in cross section view FIG. 4 which defines pin 100 fixed in supporting means 40, about which lug 90 is free to rotate. Each of the lugs 90 is pivotably unbalanced, that is, lug portion 94 exerts a greater rotational moment about pin 100, then does lug portion 96 causing the lug 90 to naturally assume (by gravity force) the alternate position, as shown in FIGS. 4 and 5A for capturing the wheels 50 on the supporting means 40.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A foldable cart apparatus which comprises: a first, second and third U-shaped frames pivotally joined and functionally movable between a folded attitude wherein the frames are positioned in adjacent planes, and an unfolded attitude wherein the first and second frames are positioned to diverge upwardly and the second and third frames are positioned to diverge downwardly; the first frame engaged with a means for supporting spaced apart wheels adapted for rotation in moving the apparatus on a surface; a flexible fabric bag fastened between the first and second of the frames forming an open topped container for receiving articles for transport, wherein the third of the frames is joined to the second of the frames by sliding clamps pivotally mounted and extending outwardly from upper terminal ends of the third of the frames, the sliding clamps movable along the second of the frames during folding and unfolding of the apparatus.

2. The apparatus of claim 1 further comprising a flexible sling engaged with the first and the third of the frames, the sling positioned so as to form, when the apparatus is moved to the unfolded attitude, a vertical rear containment wall and a horizontal bottom shelf.

3. The apparatus of claim 1 wherein the supporting means is a unitary strut.

4. The apparatus of claim 1 further comprising a plurality of pivotable side braces joining the frames and functionally defining the range of motion between the folded and unfolded attitudes of the apparatus.

5. The apparatus of claim 1 wherein the bottom strut provides, at opposing terminal ends thereof, integral and pivotable lugs, the lugs positionable for enabling the supporting means to receive the wheels for mounting the wheels at opposing positions, and alternately for capturing the wheels on the supporting means.

6. The apparatus of claim 5 wherein each of the lugs is pivotably unbalanced so as to naturally assume the alternate position for capturing the wheels on the supporting means.

7. A foldable cart apparatus which comprises: a first, second and third U-shaped frames pivotally joined and functionally movable between a folded attitude wherein the frames are positioned in adjacent planes, and an unfolded attitude wherein the first and second frames are positioned to diverge upwardly and the second and third frames are positioned to diverge downwardly; the first frame engaged with a means for supporting spaced apart wheels adapted for rotation in moving the apparatus on a surface; a flexible sling engaged between the first and the third U-shaped frames and positioned so as to form, when the apparatus is moved to the unfolded attitude, a vertical rear containment wall and a horizontal bottom shelf, wherein the third of the frames is joined to the second of the frames by sliding clamps pivotally mounted and extending outwardly from upper terminal ends of the third of the frames, the sliding clamps movable along the second of the frames during folding and unfolding of the apparatus.

8. The apparatus of claim 7 further comprising a flexible fabric bag fastened between the first and second of the frames forming an open topped container for receiving articles for transport.

9. The apparatus of claim 7 wherein the supporting means is a unitary strut.

10. The apparatus of claim 7 further comprising a plurality of pivotable side braces joining the frames and functionally defining the range of motion between the folded and unfolded attitudes of the apparatus.

11. The apparatus of claim 7 wherein the bottom strut provides, at opposing terminal ends thereof, integral and pivotable lugs, the lugs positionable for enabling the supporting means to receive the wheels for mounting the wheels at opposing positions, and alternately for capturing the wheels on the supporting means.

12. The apparatus of claim 11 wherein each of the lugs is pivotably unbalanced so as to naturally assume the alternate position for capturing the wheels on the supporting means.

\* \* \* \* \*